United States Patent [19]

Perelman

[11] Patent Number: 5,018,167
[45] Date of Patent: May 21, 1991

[54] MODEM EMPLOYING PULSE WIDTH MODULATION FOR DATA TRANSMISSION

[76] Inventor: Frank M. Perelman, 4450 Alla Rd., Los Angeles, Calif. 90066

[21] Appl. No.: 511,759

[22] Filed: Apr. 20, 1990

Related U.S. Application Data

[60] Division of Ser. No. 371,040, Jun. 26, 1989, abandoned, which is a continuation-in-part of Ser. No. 137,620, Dec. 24, 1987, abandoned.

[51] Int. Cl.[5] .............................................. H03K 7/08
[52] U.S. Cl. .......................................... 375/22; 370/9; 332/109; 340/825.63
[58] Field of Search .............. 375/22; 370/9; 332/109, 332/110; 340/870.24, 825.63; 377/41, 107; 379/53, 96; 358/133

[56] References Cited

U.S. PATENT DOCUMENTS

| | | | |
|---|---|---|---|
| 3,748,376 | 7/1973 | Parker | 375/22 |
| 3,920,901 | 11/1975 | Boehly et al. | 379/53 |
| 3,981,440 | 9/1976 | Richardson | 377/41 |
| 4,195,292 | 3/1980 | Puhick | 377/41 |
| 4,245,347 | 1/1981 | Hutton et al. | 340/825.63 |
| 4,293,737 | 10/1981 | Cepelinski | 340/825.63 |
| 4,485,400 | 11/1984 | Lemelson et al. | 379/53 |
| 4,502,024 | 2/1985 | Nishikawa et al. | 375/22 |
| 4,750,038 | 6/1988 | Welles et al. | 358/183 |
| 4,750,039 | 6/1988 | Willis | 358/22 |
| 4,870,425 | 9/1989 | Gunny | 375/22 |

*Primary Examiner*—Benedict V. Safourek
*Assistant Examiner*—Young Tse
*Attorney, Agent, or Firm*—Lee W. Tower

[57] ABSTRACT

A modem implementation a high data transmission rate is implemented by means of pulse width modulation. The timing magnitude for each baud is weighted by the binary value of the data input. Minimal components are employed and the entire circuit is comprised of digital components except for a few analog components including a comparator for detecting transitions in the received pulse width modulation signal. This modem is particularly applicable to digital transmission of a digital video picture data via telephone lines to implement a video telephone. The video picture along with the synchronization signals from a video source are digitized and stored in a memory. The video telephone operates by sending and receiving by pulse width modulation both the video data and the synchronization signals. The inverse of the video is entered into a binary counter in the modem and the pulse width is the result of counting to a transition of a more significant bit of the counter to create a pulse width modulation transmission on the telephone lines. On receiving pulse width modulation video the binaray counter is loaded with all ones and counted up until a transition of the received state is detected, Then the counter is read to recover the sent data. Provisions are included to adjust for received pulse widths longer or shorter than expected. The data from the video source or the received video can be displayed on a local monitor.

12 Claims, 4 Drawing Sheets

MODEM EMPLOYING PULSE WIDTH MODULATION FOR DATA TRANSMISSION

BACKGROUND OF THE INVENTION

This is a division application of pending patent application Ser. No. 07/371,040, filed June 26, 1989, which is a continuation in part of pending patent application Ser. No. 07/137,620, filed Dec. 24, 1987, both now abandoned.

1. Field of Invention

This invention relates generally to modems for digital data transmission.

2. Prior Art

Most modems for transmitting digital data usually transmit one bit per baud. For example, a 2400 baud modem transmits data at 2400 bits per second with each baud or bit being a binary "0" or "1". In this invention several bits of digital data are sent with each baud and the number of bits sent with each baud is multiplied by the baud rate to obtain the bits per second data rate of transmission. The state of the bits for each baud is determined in this modem by the pulse width of each baud, where the pulse width time magnitude is proportional to the binary value of the data. For example, the most significant bit of the data has the maximum impact on the pulse width as determined by its magnitude of 1 or 0. The next most significant bit has one quarter the influence of the most significant bit on the pulse width depending on its magnitude of 1 or 0 and so on for the lesser significant bits.

Use of this modem with a video telephone can significantly increase the data transmission rates across the telephone line. Presently, the most dominant modems used for videophone data transmissions use Amplitude Modulation (AM), Phase Modulation (PM), or vestigial sideband modulation (VSB). These types of modulation are essentially analog in form and require digitization by means of an analog to digital (A/D) converter after the magnitude is recovered, as opposed to digital transmission and recovery. Further, for AM the magnitude varies with each telephone line, so in order to set the amplitude, an introductory must be sent to test the line and calibrate the modem. The foregoing disadvantages are avoided with the pulse width modulation apparatus and method of this invention.

Most present videophones extract the picture information from the synchronization signals and send the picture via a modem device to the far end where the synchronization signals are replaced. In contrast, this invention captures the entire video signal, including the vertical and horizontal synchronization signals and stores them in memory for direct display via a video monitor and transmits all of this data to the receiving video telephone for direct display as well.

The following is a review of some of the key patents in the field of video telephone. U.S. Pat. No. 4,715,059 to COOPER-HART claims a function of resorting the pixels into a smaller pattern of 2000 to 5000 pixels and transmitting them over the line at a rate of 7000 bits per second. The present invention does not perform resorting and transmits the entire frame. U.S. Pat. No. 4,485,400 to Lemelson sends video information in between speech messages, and does not designate a particular format or modem design. U.S. Pat. No. 4,689,661 to Barbieri is concerned with sending multiplexed video signals for more than one camera to the receiving end via radio rather than by telephone lines. The data is transmitted in sinusoidal packets as a subcarrier and employs a specific style of multiplexing and demultiplexing, which is not pulse width modulation. U.S. Pat. No. 4,650,929 to Boerger is for distributing video for a multiplicity of subscribers for a round table discussion by video. Many terminals are involved and the invention consists of a multiplexer, central station control and multiple stations. U.S. Pat. No. 3,950,607 to Southworth deals with bandwidth compression which is a major element and aspect of many video phone systems for conventional telephone lines. The Southworth patent also includes field identification and sends separate signals to identify the field. The present invention does not involve bandwidth compression. U.S. Pat. No. 4,750,039 to Willis is concerned with a freeze frame image to display a "Picture within a Picture". The data taken from the video is compressed but not for the purpose of transmitting the data over the telephone lines and no mention of a modem or means of transmission over telephone lines is mentioned in this patent. U.S. Pat. No. 4,109,276 to Hopkins Jr. concerns itself with claiming means of storing the correct field in memory to retrieve data for a TV station with the correct field synchronization. No mention of use for transmission over narrowband telephone lines of conventional form is mentioned in this patent. U.S. Pat. No. 3,845,250 to Mamil K. Alaily concerns itself with testing for proper video synchronization signals before permitting a phone operator to route a video signal through other media for a video conference. No mention of slowing down or compressing the video data is mentioned in this patent. What is mentioned is pass or fail of a proper NTSC video signal to be passed on over another medium of conveyance. Japanese patent 56-86592 to Shiyouichirou Takayama for a Still Picture Transmitter of Transceiver Type is concerned with the use of a modem with AM, PM, and VSB; however, not with the use of pulse width modulation. U.S. Pat. No. 3,920,901 to Michael A. Boehly concerns itself with dividing frequencies down for particular handling of pixel and sync signals for transmission over some media not carefully described. Even though it is called a video phone, it is not clear that the objective is to send the signal over a narrow band telephone line. The main concern is the method of maintaining synchronization by dividing down the frequencies from a crystal source oscillator to specific frequencies that enhance maintaining synchronization. U.S. Pat. No. 4,654,866 to Deitrich Bottle concerns itself with selecting both a narrow band telephone line for audio communication and another wide bandwidth telephone line for video communication with only one phone number. The video data is not communicated over a narrow band telephone line. Instead a wideband line is selected.

From the above review of prior art there is no use in the prior art of pulse width modulation to transmit digitized or analog picture information on narrowband telephone lines. Nor does the prior art include sending the picture synchronization signals for display along with the picture data.

SUMMARY OF THE INVENTION

This invention employs means of sending data via telephone wires, radio voice channels or conventional wires or any voice channel using pulse width modulation. The inventor has analyzed that the effect of limited bandwidth on the phase of the signal passing through channel of limited bandwidth is constant delay. In effect there is a constant transport delay. Because of this, the variations in pulse width are all delayed equally and the signal passes through the channel of limited bandwidth with no distortion to the pulse width arriving at the receive end. The limited bandwidth at most changes what should be a square wave to a sine wave, but the crossover positions are maintained. The results of this analysis are employed in this invention for applying a wideband signal to a channel of less bandwidth than the signal generated. A further benefit of the pulse width modulation is that the transmission apparatus and the receiving apparatus are comprised primarily of digital components with only a coupling of the telephone line to a comparator to distinguish the zero crossings and identify the pulse width.

The digital data for either pixels or synchronization signals are comprised of binary words of any length desired. To transmit a binary word, the inverse of the binary word is loaded into a counter, which is then permitted to count. The count time to reach a transition of the last bit of the counter determines the pulse width. If the binary word is zero, then the inverse of the binary word is all ones and the count time to reach the transition is minimum. Alternately, if the binary word is of all ones, then the inverse is zero which corresponds to a maximum count time to reach the transition. By applying the last bit of the counter to a telephone line the digital data is sent via pulse width modulation.

The receive end uses a clock frequency identical to that of the send end and the clock frequencies can be held within close tolerance by the use of a crystal oscillator. The receive counter is preset to all ones, which corresponds to the minimum pulse width for the range of the binary bits applied at the send end. In the receive mode the counter continues until a transition occurs in the telephone line reception. At the time of the crossover transition on the telephone line, the data bits on the receive counter are frozen and stored, as data. If the time is the same as the minimum time, then the magnitude is zero. If the time is longer from the minimum time, the magnitude of the binary bits is higher.

Another way to express the relationship between the send and receive counter is the following example, where it is assumed that the data being sent is six bit binary words. The send end loads the inverse of the data into the counter and then counts to a transition. Suppose that the data is digital 60=111100 binary. Then 000011=digital 3 is loaded into the counter and the counter counts up. Suppose the send transition always occurs at count 512, then the time to reach the transition is 509 clocks. On the receive end the counter is always loaded with digital 63=111111 binary. Counting for the 509 sending clocks will advance the receive counter to 509+63=572; however, 572 mod 512=60 digital or 111100 binary, which is exactly the data sent.

To prevent tolerances that make the receiving end count slightly shorter in time, than the minimum time, the data bit after the most significant bit is monitored for a transition. If the transition has not occurred, then the data is considered to be zero. If the transition has occurred, then the data bits are read out for their magnitude. Similarly by monitoring these higher bits, it can be determined if the timing has exceeded the maximum value or not. In this manner and with these determinations from the higher bits, the magnitude of the data can employ limits at the high end and low end to prevent ambiguity.

The frequency of the output data can be controlled to comply with the bandwidth media of transmission. For example, to transmit on a normal telephone line one frequency can be used, while to transmit via a noisy telephone line or for use in narrowband radio, a lower frequency can be used. This is accomplished by changing the count to a transition on the counter to, for example, 1024 instead of 512 in the example in the preceding paragraph.

Another feature of this invention is to record into memory the entire video signal including the synchronization signals and including these synchronization signals in the data transmission. This method benefits displaying the picture at both ends. At the receive end after storing the data in memory, the picture is directly displayed by merely addressing the memory in sequence and sending the data via a digital to analog converter to drive the composite video input of a monitor, or modulate the RF input to a television set with the analog converted output.

Including the synchronization signals in the normal pulse width modulation and storing them into memory not only reduces cost by reducing the number of parts required, but also improves the picture received in the presence of noise. With each line including a synchronization pulse, each displayed data line will be re-synchronized by the horizontal synchronization circuitry in the video display monitor to properly display the lines that survive the noise.

DESCRIPTION OF THE PREFERRED EMBODIMENTS

Figure 1:
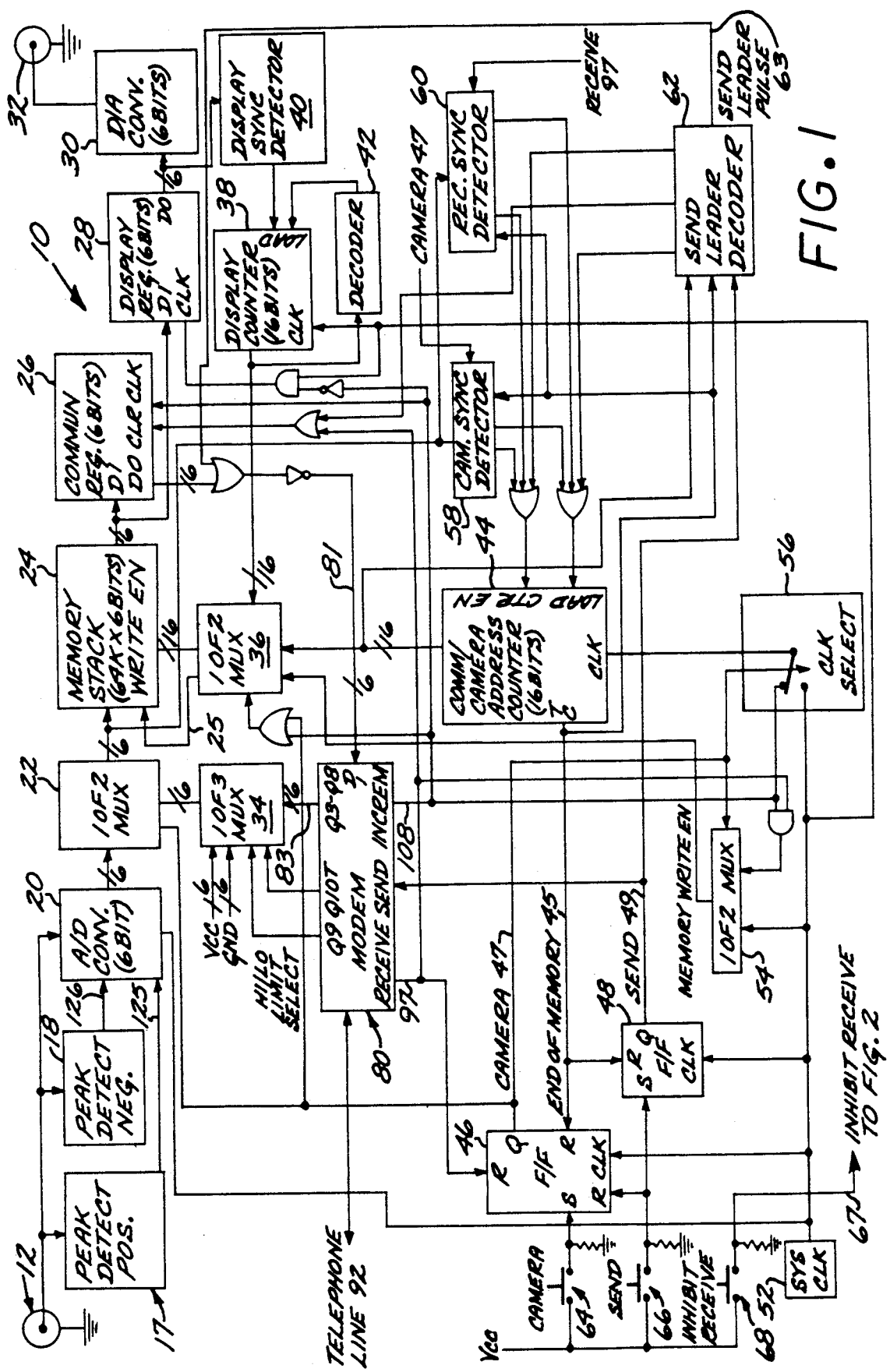
FIG. 1 is a logic and block diagram of the video telephone employing pulse width modulation for data transmission of the present invention.

There are four primary modes of the video telephone employing pulse width modulation for data transmission 10, shown in FIG. 1. In the first mode a frame of data is loaded into memory stack 24 from camera input 12 via analog to digital converter 20. The second mode is to display the frame of data on a local monitor via monitor output 32. In this mode the data is read from memory stack 24 and through digital to analog converter 30 via display register 28. This second mode can also be called the standby mode, because it is the default mode if nothing else is occurring. The third mode is to send the frame of data stored in memory stack 24 to another video telephone employing pulse width modulation for data transmission 10 via modem 80 and telephone line 92. The fourth mode is to receive a frame of data via telephone line 92 and modem 80 and to store this data into memory stack 24 for local display via the second mode. In all the modes the data stored in memory stack 24 includes not only the video data, but also the synchronization signals. With this brief introduction the following will more fully explain the operation of video telephone employing pulse width modulation for data transmission 10 for each mode.

Figure 3:
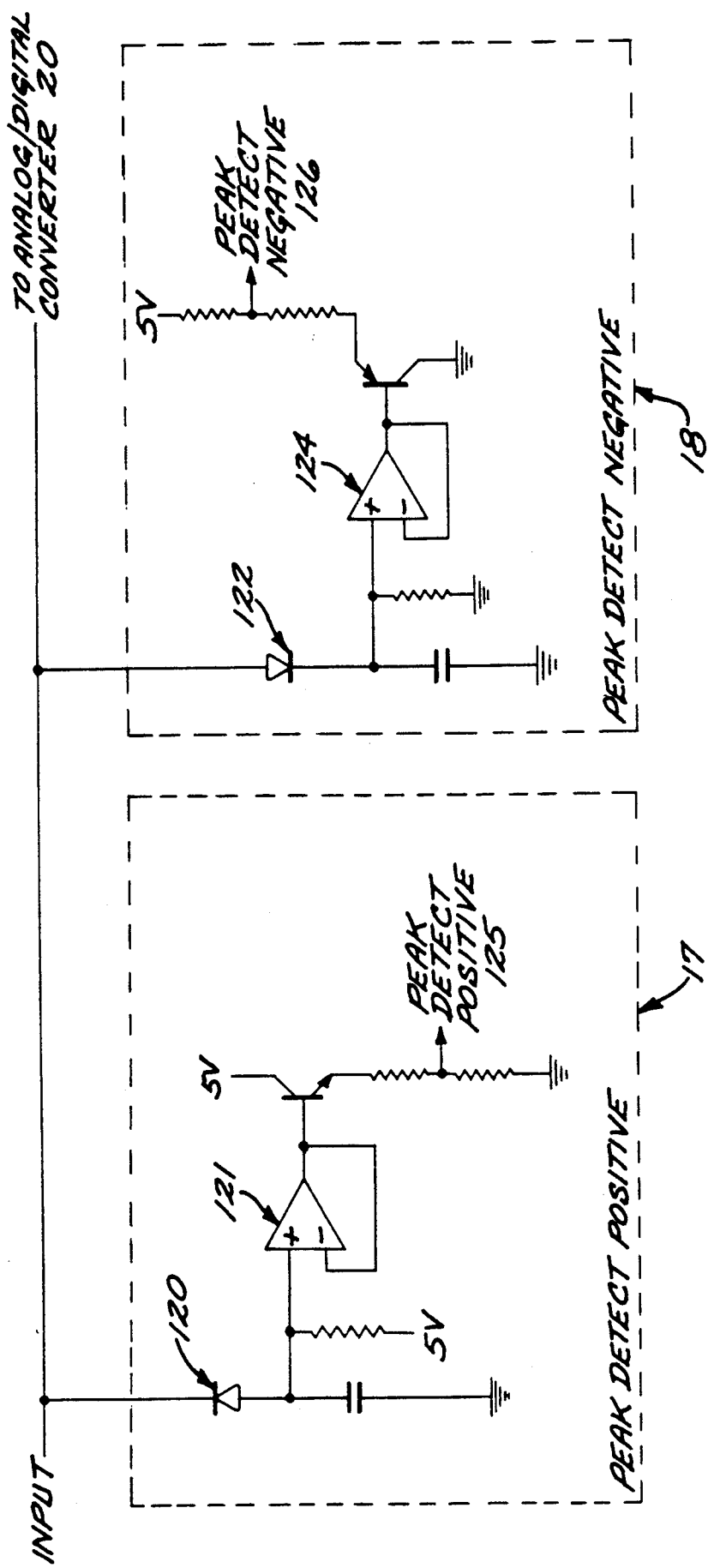
FIG. 3 is a circuit diagram of the peak detect positive and negative circuitry.

The data from a video camera is converted into 6 bit data by analog to digital converter 20, which digitizes the analog picture data with the magnitude of the binary word equal to zero at the most negative level of the data and equal to all ones or maximum magnitude at the most positive level of the data. The levels of the analog to digital converter 20 are adjusted by peak detect positive 17 and peak detect negative 18, which are further described in FIG. 3. Essentially, peak detect positive 17 and peak detect negative 18 properly position the levels of the A/D converter between the peak positive and negative signals from the camera. The circuits shown in FIG. 3 are feedback circuits and contain diodes 120 and 122 and operational amplifiers 121 and 124. The operation of the peak detectors is not essential to the operation of the present invention, but some function that performs a similar function is desirable to ensure proper conversion of all the signals. An alternate design is to have an analog or digital gain control circuit to adjust the signal amplitude to be within the limits of the A/D converter.

The analog to digital converter 20 is operated at the system clock rate of 3.579545 megahertz, which is color burst frequency in video terminology, provided by system clock 52. The analog to digital converter 20 feeds multiplexer 22, which is controlled from flip flop 46. Flip flop 46 is set by camera push button 64 so that camera signal 47 is true. Camera signal 47 also selects the clock for communication/camera address counter 44 via clock select 56, the write enable for memory stack 24 via multiplexer 54 and multiplexer 36, and the 16 bit address from communication/camera address counter 44 for memory stack 24 via multiplexer 36. The camera sync signal for the frame is sensed by camera sync detector 58, which loads communication/camera address counter 44 with the start address and enables communication/camera address counter 44 to count until the end of memory signal 45 is sensed, which can be the end count of the counter. In this manner the memory stack 24 is loaded with a frame of data.

Once a frame of data is stored in memory stack 24 it can be displayed on a local composite monitor via monitor output 32. The memory stack 24 is addressed via display counter 38, which is selected as the 16 bit address for memory stack 24 by multiplexer 36 whenever the camera mode or the send or receive mode increment signal 108 are not present. The clock for the display counter 38 is system clock 52. The display counter 38 is cycled or reloaded with the start address by either decoding the counter address via decoder 42 or by employing display sync detector 40, which can detect the vertical sync signal or the shortened duration odd field transition line at the end of the even field to reload the start address. The data read from memory stack 24 is loaded into display register 28, which is 6 bits deep and then converted to analog by digital to analog converter 30, which in turn feeds monitor output 32. Of course, the picture is a frozen frame, which was captured in the camera mode. The picture displayed could also be the picture received and stored into memory stack 24 in the receive mode.

Figure 4:
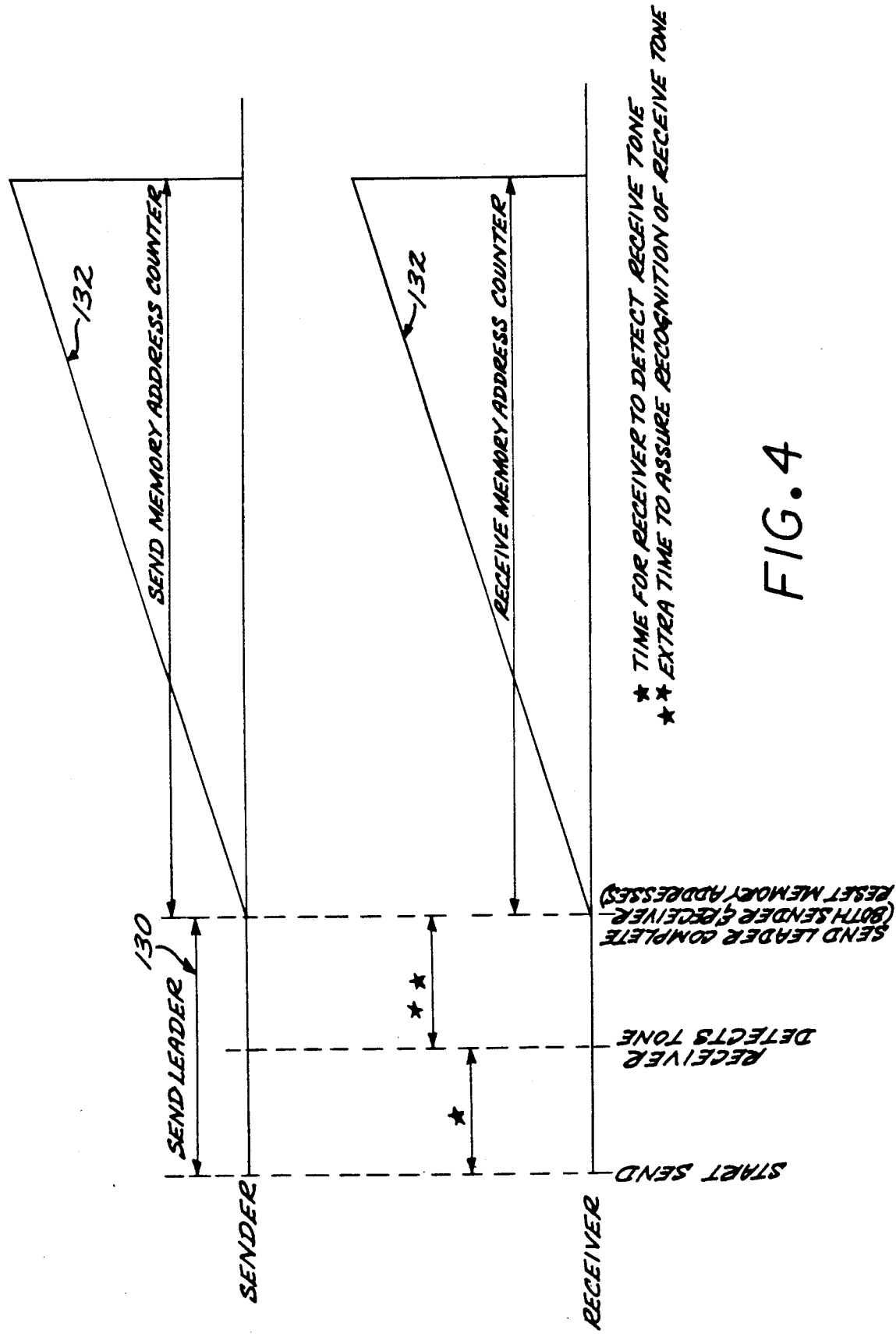
FIG. 4 is a timing diagram of the send and receive end showing the send leader timing and the memory address counters.

Next the send mode is described. The send mode is generally initiated by pushing send push button 66 after the picture captured in the camera mode has been displayed in the display mode and found to be satisfactory. To ensure that the camera mode is off, the send push button 66 resets the flip flop 46; however, it would generally be reset at this time anyway by the end of memory signal 45. The send push button 66 sets flip flop 48 to set the send signal 49 true, which is sent to modem 80 and to send leader decoder 62. The send leader decoder 62 sends load and counter enable signals to communication/camera address counter 44 and receives the output of communication/camera address counter 44 for decoding. FIG. 4 shows the macro timing of the send mode to a remote receiver. At the beginning, the sender sends a send leader time 130, whose purpose is for detection by the receiver so that the sender and the receiver are synchronized.

Functionally the send leader signal is sent by clearing communication register 26, so that the data out (D0) lines are all zero. Note that on FIG. 1, the D0 lines are inverted before being sent to modem 80. Thus all ones are sent into the modem, which results in the minimum pulse width. This minimum pulse width for the send leader signal is sent for the time period determined by the send leader decoder 62, which is generally at least 1.5 seconds. The receiver is designed to look for at least a 0.25 second send leader, which gives the receiver a relatively long time to recognize the send leader. At the end of the send leader signal a maximum pulse width baud is sent by setting the send leader pulse 63 high for one clock. Note that this signal is "ORed" with D0 from communication register 26 and then inverted for input to modem 80. Thus the input to modem 80 is all zeros, which corresponds to the maximum pulse width. The detection by the receiver of a long minimum pulse width of at least 0.25 seconds followed by one maximum pulse width synchronizes the receiver to the sender. Once the sender and the receiver are synchronized, as shown in FIG. 4, the send memory address counter count 132 and the receive memory address counter count 132 are the same.

After the send leader time and the send leader pulse 63, the send leader decoder 62 reloads communication/camera address counter 44 and enables it to count. The 16 bit address generated is sent to memory stack 24 via multiplexer 36, which is switched momentarily to output communication/camera address counter 44 rather than display counter 38 by increment signal 108. Signal increment signal 108 is explained further below with the rest of the modem. Note that increment signal 108 is also the clock in this mode for communication/camera address counter 44 as selected by clock select 56. The frame of data stored in memory stack 24 is loaded into communication register 26. The output D0 of communication register 26 is inverted and applied to modem 80. As explained before a large binary data value will result in a short pulse width, while a small binary data value results in a relatively long pulse width. Of course, this is just one embodiment of the present invention and a modem can be built with a large binary data value corresponding to a long pulse width and a small binary data value corresponding to a relatively short pulse width.

Figure 2:
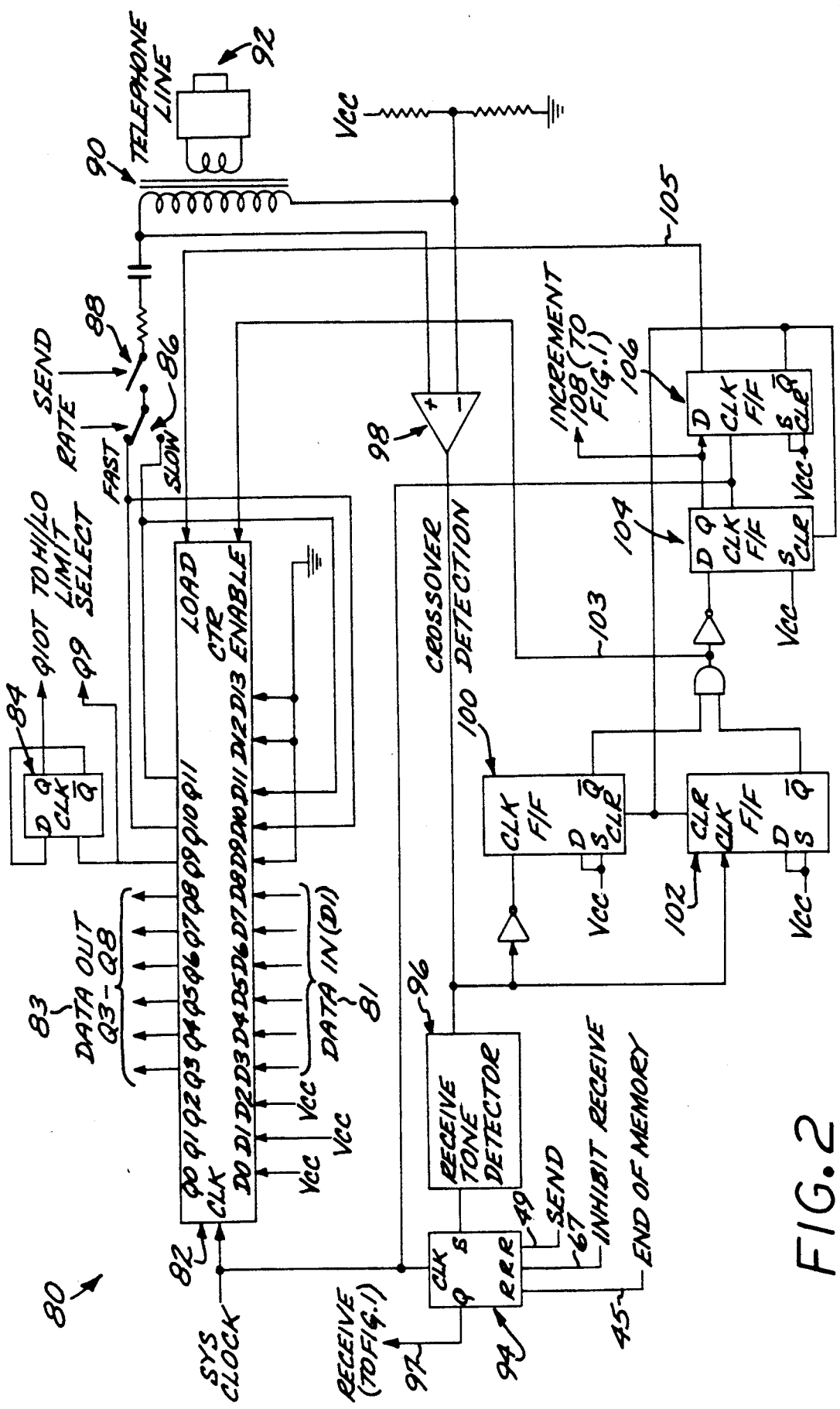
FIG. 2 is logic and block diagram of the pulse width modulation modem of the present invention.

FIG. 2 shows the detailed design of the modem of the present invention. The data input 83, which is the inverted output of communication register 26, is input to modem counter 82. The modem counter 82, which is a twelve (12) bit counter, counts at the system clock 52 rate, which is 3.579545 megahertz. The counter is loaded with the data presented at data in 81 and then counts up. A rate switch 86 selects between a fast and slow rate, which are derived by observing the transitions on either Q10 or Q11 of modem counter 82. These transitions are sent via transformer 90 to telephone line 92. The transformer is not really necessary, but does serve as a safety device to isolate the power supply for the modem from the telephone line. Also the continuity of the transformer 90 also permits holding the telephone line in the "off hook" condition when applied to the telephone line.

The transitions of Q10 or Q11 are also detected by crossover detector 98, which in the send mode triggers flip flop 100 and flip flop 102 to produce count enable 103 and via flip flop 104 and flip flop 106 load signal 105 for modem counter 82. Another signal produced is increment signal 108. Since the D0, D1 and D2 bits are set high, the D9 bit is set low, and the D10 input toggles when the counter is loaded, the pulse width varies between 143 microseconds and 286 microseconds in the fast mode, which corresponds to 512 and 1024 clock counts at the system clock 52 rate. When this is converted to minimum and maximum frequency, we obtain a baud rate between 1.75 kilohertz and 3.5 kilohertz. This corresponds to the bandwidth of a normal telephone line. However, since the pulse width encodes 6 bits of data, the bit rate varies between 6/143 microseconds=41.95 kilobits/second and 6/286 microseconds=20.97 kilobits/second. The increment signal 108 signal is sent each time a transition or end of pulse width is detected. This increment signal 108 momentarily switches multiplexer 36 to output communication/camera address counter 44 rather than display counter 38, increments communication/camera address counter 44 via clock select 56, clocks communication register 26, and momentarily disables the clock to display counter 38. This last function is so that the local display does not have a glitch put onto it.

The modem in FIG. 2 also has a slow rate selectable by switch 86. In the slow mode, the toggling Q11 bit of modem counter 82 is observed, and the pulse width varies between 286 microseconds and 572 microseconds, which corresponds to 1024 and 2048 clock counts at the system clock 52 rate. When this is converted to minimum and maximum frequency, we obtain a baud rate between 874 hertz and 1.75 kilohertz, which is an appropriate bandwidth for a lower bandwidth media, such as a noisy telephone line or a narrowband radio. Since the pulse width encodes 6 bits of data, the bit rate varies between 6/286 microseconds=20.97 kilobits/second and 6/572 microseconds=10.49 kilobits/second.

The same mechanism used to obtain the fast and slow modes illustrated here, can be used to obtain other faster or slower modes as the media may require.

The last mode is the receive mode, which has been partially described by virtue of describing the send mode. In the receive mode, the send leader is detected to be on the telephone line by receive tone detector 96, which can be implemented with a National LM 567 part. The purpose of the receive tone detector 96 is to detect the presence of a tone generated by the sending unit. When the receive tone is detected, then the flip flop 94 on FIG. 2 is set. Note that this flip flop is reset by the send mode, the inhibit receive button 68, and by the end of memory signal 45. The receive signal resets flip flop 46, gates increment signal lOS for the write enable for memory stack 24, and clears communication register 26. The latter function sets the data out (D0) of the communication register 26 to zero; however, since this is inverted before being input to modem 80, modem counter 82 is loaded with all ones, whenever it is loaded in the receive mode.

Once in the receive mode, the multiplexer 22 is set to output data from multiplexer 34 rather than analog to digital converter 20. The receive sync detector 60 detects that the send leader, which is a series of all ones for at least 0.25 seconds, has been followed by all zeros. This is for the purpose of synchronizing the receiver. On detecting this sequence, receive sync detector 60 loads communication/camera address counter 44 with the start count and enables it to count. It counts at the rate of increment signal 108 and addresses the memory stack 24. The modem counter 82 is loaded with all ones and allowed to count until the next transition is detected on the line by crossover detector 98. At that time data out 83 is written into memory stack 24 via multiplexer 34 and multiplexer 22.

There is a possibility that due to the tolerances between the sender clock and the receiver system clock 52, which are nominally at the same color burst frequency, there may be a mismatch and the pulse width may be shorter or longer than expected. To protect against this possibility, a hi/lo limit select function is included, which is illustrated in FIG. 2 for the fast rate mode. The hi/lo limit select function keeps track of the Q9 bit of the modem counter 82, and because the Q10 bit of the modem counter toggles by design, Q10T the output of flip flop 84 is used by the hi/lo limit select function to obtain a true count on modem counter 82. For the fast rate mode, if Q10T is low then the receive pulse width is too short and the data stored in memory stack 24 will be set to all zeros, which corresponds to the minimum pulse width. This is done via multiplexer 34. Alternately, if Q10T is high and Q9 is also high, then the receive pulse width is too long and the data stored in memory stack 24 will be set to all ones, which corresponds to the maximum pulse width. Again this is done via multiplexer 34.

In examining the circuitry shown in this embodiment, it can be seen that only a transformer 90 and a comparator 98 with some miscellaneous discrete resisters and capacitors are the only part employed that are analog. The remainder of the parts are digital, which provides high reliability and ease of implementation with programmable logic chips or other well known implementation techniques known in the art.

It is thought that the video telephone employing pulse width modulation for data transmission 10 of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. An apparatus for a modem employing pulse width modulation for sending and receiving digital data that comprises:
   a binary counter having a plurality of lesser significant bit positions and a selected more significant bit position;
   a means for clocking said binary counter coupled to said binary counter;
   a means for detecting the transition from one state to another of said selected more significant bit position of said binary counter coupled to said selected more significant bit position;

a means for loading said plurality of lesser significant bit positions of said binary counter with the inverse of digital data to be sent responsive to said means for detecting the transition from one state to another of said selected more significant bit position;

a means for loading said selected more significant bit position of said binary counter with said selected more significant bit position's state responsive to said means for detecting the transition from one state to another of said selected more significant bit position; and a means for sending signals coupled to said selected more significant bit position.

2. The apparatus for a modem employing pulse width modulation for sending and receiving digital data of claim 1 that further comprises:

a means for receiving signals;

a means for loading said plurality of lesser significant bit positions of said binary counter with all ones upon detecting a transition from one state to another of signals received from said means for receiving signals coupled to said binary counter and to said means for receiving signals; and a means for reading said plurality of lesser significant bit positions of said binary counter for recovering the sent data upon detecting a transition from one state to another of signals received from said means for receiving signals coupled to said binary counter.

3. The apparatus for a modem employing pulse width modulation of claim 2 that further comprises;

a means for detecting that a received pulse width exceeds a selected maximum time length and substituting a maximum value for the lesser significant bit positions read from said binary counter; and a means for detecting that a received pulse width does not equal or exceed a selected minimum time length and substituting a minimum value for the lesser significant bit positions read from said binary counter.

4. An apparatus for a modem employing pulse width modulation for sending and receiving digital data that comprises:

a binary counter having a plurality of lesser significant bit positions and a selected more significant bit position;

a means for clocking said binary counter coupled to said binary counter;

a means for detecting the transition from one state to another of said selected more significant bit position of said binary counter coupled to said selected more significant bit position;

a means for loading said plurality of lesser significant bit positions of said binary counter with the digital data to be sent responsive to said means for detecting the transition from one state to another of said selected more significant bit position;

a means for loading said selected more significant bit position of said binary counter with said selected more significant bit position's state responsive to said means for detecting the transition from one state to another of said selected more significant bit position; and a means for sending signals coupled to said selected more significant bit position.

5. The apparatus for a modem employing pulse width modulation for sending and receiving digital data of claim 4 that further comprises:

a means for receiving signals;

a means for loading said plurality of lesser significant bit positions of said binary counter with all zeros upon detecting a transition from one state to another of signals received from said means for receiving signals coupled to said binary counter and to said means for receiving signals; and a means for reading said plurality of lesser significant bit positions of said binary counter and for inverting said read plurality of lesser significant bit positions for recovering the sent data upon detecting a transition from one state to another of signals received from said means for receiving signals coupled to said binary counter.

6. The apparatus for a modem employing pulse width modulation of claim 5 that further comprises:

a means for detecting that a received pulse width exceeds a selected maximum time length and substituting a minimum value for the lesser significant bit positions read from said binary counter; and a means for detecting that a received pulse width does not equal or exceed a selected minimum time length and substituting a maximum value for the lesser significant bit positions read from said binary counter.

7. A method for employing pulse width modulation for sending and receiving digital data comprising the steps of:

counting in binary on each clock a binary counter having a plurality of lesser significant bit positions and a selected more significant bit position;

detecting the transition from one state to another of said selected more significant bit position of said binary counter;

loading said plurality of lesser significant bit positions of said binary counter with the inverse of digital data to be sent upon detecting the transition from one state to another of said selected more significant bit position;

loading said selected more significant bit position of said binary counter with said selected more significant bit position's state upon detecting the transition from one state to another of said selected more significant bit position; and sending signals corresponding to the state of said selected more significant bit position.

8. The method for employing pulse width modulation for sending and receiving digital data of claim 7 further comprising the steps of:

receiving signals;

loading said plurality of lesser significant bit positions of said binary counter with all ones upon detecting a transition from one state to another of received signals; and reading said plurality of lesser significant bit positions of said binary counter for recovering the sent data upon detecting a transition from one state to another of received signals.

9. The method for employing pulse width modulation for sending and receiving digital data of claim 8 further comprising the steps of:

substituting a maximum value for the lesser significant bit positions read from said binary counter upon detecting that a received pulse width exceeds a selected maximum time length; and substituting a minimum value for the lesser significant bit positions read from said binary counter upon detecting that a received pulse width does not equal or exceed a selected minimum time length.

10. A method for employing pulse width modulation for sending and receiving digital data comprising the steps of:
- counting in binary on each clock a binary counter having a plurality of lesser significant bit positions and a selected more significant bit position;
- detecting the transition from one state to another of said selected more significant bit position of said binary counter;
- loading said plurality of lesser significant bit positions of said binary counter with the digital data to be sent upon detecting the transition from one state to another of said selected more significant bit position;
- loading said selected more significant bit position of said binary counter with said selected more significant bit position's state upon detecting the transition from one state to another of said selected more significant bit position; and
- sending signals corresponding to the state of said selected more significant bit position.

11. The method for employing pulse width modulation for sending and receiving digital data of claim 10 further comprising the steps of:
- receiving signals;
- loading said plurality of lesser significant bit positions of said binary counter with all zeros upon detecting a transition from one state to another of received signals; and
- reading said plurality of lesser significant bit positions of said binary counter and inverting said read plurality of lesser significant bit positions for recovering the sent data upon detecting a transition from one state to another of received signals.

12. The method for employing pulse width modulation for sending and receiving digital data of claim 11 further comprising the steps of:
- substituting a minimum value for the lesser significant bit positions read from said binary counter upon detecting that a received pulse width exceeds a selected maximum time length; and
- substituting a maximum value for the lesser significant bit positions read from said binary counter upon detecting that a received pulse width does not equal or exceed a selected minimum time length.

* * * * *